United States Patent
Lavios (10) Patent No.: US 8,885,789 B2
(45) Date of Patent: Nov. 11, 2014

(54) DEVICE FOR MEASURING AND CORRECTING A PARALLELISM ERROR IN A NUCLEAR FUEL ROD

(75) Inventor: Daniel Lavios, Laudun L'ardoise (FR)

(73) Assignee: Areva NC, Paris (FR)

( * ) Notice: Subject to any disclaimer, the term of this patent is extended or adjusted under 35 U.S.C. 154(b) by 679 days.

(21) Appl. No.: 13/063,455

(22) PCT Filed: Sep. 14, 2009

(86) PCT No.: PCT/EP2009/061839
§ 371 (c)(1),
(2), (4) Date: Mar. 10, 2011

(87) PCT Pub. No.: WO2010/029166
PCT Pub. Date: Mar. 18, 2010

(65) Prior Publication Data
US 2011/0164717 A1    Jul. 7, 2011

(30) Foreign Application Priority Data
Sep. 15, 2008   (FR) ..................... 08 56182

(51) Int. Cl.
| | |
|---|---|
| *G01B 5/25* | (2006.01) |
| *B21D 3/10* | (2006.01) |
| *G21C 17/06* | (2006.01) |
| *G21C 3/00* | (2006.01) |
| *G21C 19/02* | (2006.01) |
| *G01B 7/28* | (2006.01) |
| *G21C 17/00* | (2006.01) |

(52) U.S. Cl.
CPC .. *G01B 5/25* (2013.01); *B21D 3/10* (2013.01); *G21C 19/02* (2013.01); *G01B 7/281* (2013.01); *G21C 17/06* (2013.01)
USPC .......... 376/258; 376/245; 376/259; 376/409; 376/451

(58) Field of Classification Search
USPC ......... 376/245, 258–262, 409, 426, 434, 448, 376/450, 463, 451
See application file for complete search history.

(56) References Cited

U.S. PATENT DOCUMENTS

| | | | |
|---|---|---|---|
| 3,429,169 A | 2/1969 | Boice et al. | |
| 3,456,467 A | 7/1969 | Hogarth | |

(Continued)

FOREIGN PATENT DOCUMENTS

| | | | |
|---|---|---|---|
| EP | 0441629 A2 | 8/1991 | |
| FR | 2587107 A1 | 3/1987 | |

(Continued)

OTHER PUBLICATIONS

International Search Report and Written Opinion in PCT Application No. PCT/EP2009/061839, dated Dec. 23, 2009.

(Continued)

*Primary Examiner* — Bernarr Gregory
(74) *Attorney, Agent, or Firm* — Nixon Peabody LLP (57) ABSTRACT

A device for measuring and correcting a parallelism error of an upper plug end of a nuclear fuel rod comprising mechanisms for measuring a parallelism error and for correcting said error, and a mechanism for positioning said device on the fuel rod and cooperating with a rack on which the fuel rod is stored, said correction means being arranged opposite the measuring mechanism relative to the location of the fuel rod, in order to allow a measurement of the parallelism error during correction of said error.

12 Claims, 10 Drawing Sheets

(56) References Cited

U.S. PATENT DOCUMENTS

| | | | | |
|---|---|---|---|---|
| 4,857,260 A | * | 8/1989 | Schoenig et al. | 376/245 |
| 5,282,229 A | * | 1/1994 | Ukai et al. | 376/245 |
| 5,375,756 A | * | 12/1994 | Haughton et al. | 376/261 |
| 5,425,070 A | * | 6/1995 | Gosnell et al. | 376/260 |
| 2005/0135539 A1 | * | 6/2005 | Joly et al. | 376/262 |

FOREIGN PATENT DOCUMENTS

| | | |
|---|---|---|
| FR | 2593095 A1 | 7/1987 |
| GB | 462336 A | 3/1937 |
| JP | 53-126940 U | 10/1978 |
| JP | 55-000416 A | 1/1980 |
| JP | 62-040933 A | 2/1987 |
| JP | 12-27915 A | 9/1989 |
| JP | 07-284853 A | 10/1995 |
| JP | 10-123283 A | 5/1998 |
| JP | 10-185552 A | 7/1998 |
| JP | 10-197239 A | 7/1998 |
| JP | 11-038176 A | 2/1999 |
| JP | 11-052089 A | 2/1999 |
| JP | 11-179430 A | 7/1999 |
| WO | 2004/053414 A1 | 6/2004 |

OTHER PUBLICATIONS

International Preliminary Report on Patentability in PCT Application No. PCT/EP2009/061839, dated Nov. 12, 2010.

French Search Report in French Application No. FR 0856182, dated Apr. 9, 2009.

Office Action in Japanese Patent Application No. 2011-526501 dated Dec. 3, 2013.

* cited by examiner

DEVICE FOR MEASURING AND CORRECTING A PARALLELISM ERROR IN A NUCLEAR FUEL ROD

CROSS REFERENCE TO RELATED APPLICATIONS OR PRIORITY CLAIM

This application is a National Phase of PCT/EP2009/061839, filed Sep. 14, 2009, entitled, "DEVICE FOR MEASURING AND CORRECTING A PARALLELISM ERROR OF A NUCLEAR FUEL ROD", and claims priority of French Patent Application No. 08 56182, filed Sep. 15, 2008.

TECHNICAL FIELD AND BACKGROUND OF THE INVENTION

The present invention relates to a device for measuring and correcting a parallelism error in a nuclear fuel rod, more particularly a parallelism error in the end provided with the upper plug.

A nuclear fuel assembly is made up of a plurality of nuclear fuel rods arranged parallel to each other such that the assembly has a substantially square transverse section.

Each fuel rod comprises a fuel clad, which is a very long tube with a small diameter, covered at its lower end and in which the cylindrical nuclear fuel pellets with a circular section are stacked. When the required number of pellets has been introduced into the fuel clad, its open end is covered by a plug, called the upper plug. This assembly formed by the fuel clad, the lower and upper plugs and the pellets constitutes the fuel rod.

The assembly comprises a lower end receiving the end of each fuel rod provided with a lower plug and an upper end receiving the end of each fuel rod provided with the upper plug. The lower end and the upper end are provided with housings individually receiving each rod end. The upper and lower ends are connected by rigid rods so as to form a rigid frame.

In order to be able to guarantee a good connection between the fuel rod, more particularly its end provided with the upper plug, and the upper cap, the parallelism of the upper plug end must be sufficient.

However, a parallelism error may appear at the end of the upper plug when the upper plug is welded on the lower plug welded tube, or LPWT, which corresponds to the fuel clad provided with the lower plug. Such an error can also appear due to an accidental deformation of the end of the upper plug during the handling of the fuel rods. Other causes can be at the root of this parallelism error.

Document JP10 123283 describes a device for measuring the parallelism error of a fuel rod end comprising a probe, the fuel rod being made to rotate.

This document also describes a device for measuring a parallelism error comprising at least two linear probe probes orthogonal to the axis of the fuel rod, to measure the axis of the upper plug, the use of at least two probes making it possible to avoid making the fuel rod rotate. This measurement makes it possible to measure the gap between the axis of the upper plug and that of the fuel rod.

These measuring devices do not make it possible to correct the parallelism error.

Moreover, correcting the error must be very controlled to avoid creating another parallelism error, by overcorrecting the first error.

It is therefore one aim of the present invention to offer a device making it possible both to measure a parallelism error and correct it, reliably.

BRIEF DESCRIPTION OF THE INVENTION

The previously stated aim is achieved by a device for measuring a parallelism error and correcting that error, comprising means for measuring the error, and means for correcting the error, the measuring and correction means being arranged such that they enable a real-time measurement of the error, more particularly its evolution during correction thereof. The device also comprises means for positioning said device on the fuel rod and cooperating with a rack on which the fuel rod is stored.

Thus, this device prevents overcorrecting the error and causing another one to appear. It is easy to transport and handle.

Moreover, it makes it possible to perform the measurement and correction with a single device, which prevents fuel rod manipulations, therefore reducing the risk of deterioration thereof. Moreover, the time needed for these two steps is noticeably reduced. As a result, the time to manufacture a fuel rod is reduced.

It is advantageously provided that this device is portable, which prevents having to move the fuel rods, since the measuring and correction device is moved.

The present invention then primarily relates to a device for measuring and correcting a parallelism error of an upper plug end of a nuclear fuel rod comprising means for measuring a parallelism error and means for correcting said error, said correction means being positioned opposite the measuring means relative to the location of the fuel rod, in order to enable measurement of the parallelism error during correction of said error.

The measuring means comprise, for example, a probe intended to come into contact with the periphery of the upper plug end of the fuel rod, said probe being able to move along an axis transverse to the axis of the location of the fuel rod.

The correction means can comprise a push-piece intended to come into contact with the periphery of the upper plug end of the fuel rod, said push-piece being able to move along an axis transverse to the axis of the location of the fuel rod, the axis of movement of the push-piece and the axis of movement of the probe being contained in a plane containing the axis of movement of the fuel rod.

The device according to the invention can also comprise means for holding the fuel rod while making it possible to rotate said fuel rod around the longitudinal axis thereof, said holding means comprising a lower claw and an upper claw intended to grip the fuel rod, the lower claw forming a reference for measuring the parallelism error.

Advantageously, the claws are made from a friction-reducing material, for example Ertalyte®, which makes it possible to ensure holding of the fuel rod without preventing the rotation of the fuel rod.

The upper claw is advantageously hingedly mounted around an axis parallel to the axis of the location of the fuel rod, and means for locking the upper and lower claws in the holding position being provided, which facilitates the placement of the fuel rod.

The push-piece is, for example, mounted on one end of a threaded rod mounted in a tapped hole made at the end of an arm, said rod comprising a handle at the end opposite that one on which the push-piece is fixed, making it possible to move the push-piece manually.

A stop is advantageously fixed on the rod to which the push-piece is fixed so as to limit the movement of the push-piece towards the probe, which prevents excessive deformation of the upper plug end.

The device according to the invention can also comprise a ring between the holding means and the correction means, with an axis parallel to the axis of the location of the fuel rod, said ring being intended to be passed through by the fuel rod and intended to react the deformation forces applied to the fuel rod.

The device according to the invention can also comprise an axial stop for the fuel rod, this stop being arranged transversely relative to the axis of the location of the fuel rod, downstream of the measuring means in the direction of insertion of the fuel rod in the device. The positioning of the fuel rod is then made easier.

The device can also comprise means for positioning said device relative to the fuel rod, said positioning means being intended to cooperate with the fuel rod and a rack on which the fuel rod is stored, said positioning means comprising two horseshoe-shaped pieces whereof the inner bottoms are intended to rest on an upper zone of the periphery of the fuel rod, the two pieces being spaced apart from each other by a given distance, so as to allow the overlap of the rack on which the upper plug end of the fuel rod rests, the support having a thickness substantially equal to the distance separating the two horseshoe-shaped pieces. These means prevent having to use an outer support by using the rack and the fuel rod as support.

For example, the measuring means and the correction means are carried by a platform connected to the positioning means by two parallel beams intended to border the fuel rod.

The locking means of the upper and lower claws are for example made up of a threaded rod hingedly mounted around an axis parallel to the axis of the location of the fuel rod, on a side opposite that on which the upper claw is hinged, and a button screwed on the threaded rod, the claw comprising a notch to receive the threaded rod, the button being arranged opposite the lower claw relative to the upper claw when the is in the notch, to ensure the locking of the lower and upper claws. These locking means are easy to make and provide quick and effective locking.

The present invention also relates to a method for measuring and correcting a parallelism error using the measuring and correction device according to the invention, comprising the following steps:

a) placing the device on the fuel rod at the upper plug end,
b) moving the fuel rod along its axis to position it between the measuring means and the correction means,
c) locking the holding means of the fuel rod,
d) rotating the fuel rod and detecting the parallelism error,
e) determining the correction to be made,
f) orienting this error towards the correction means,
g) correcting this error by applying a deformation force applied by the correction means, and simultaneous checking with the information provided by the measuring means,
h) verifying the parallelism error by checking that it is below a given threshold value,
i) repeating steps d) to h) if the value of the parallelism error is greater than the given threshold value.

It is advantageously provided to rotate the fuel rod manually, making the method simple and the device even less bulky and more robust.

BRIEF DESCRIPTION OF THE DRAWINGS

The present invention will be better understood using the following description and drawings, in which.

DETAILED DESCRIPTION OF THE INVENTION

FIG. 1 and FIGS. 2A to 2I' show an embodiment of a measuring and correction device 2 of a nuclear fuel rod, designated device in the rest of the description.

Figure 1:
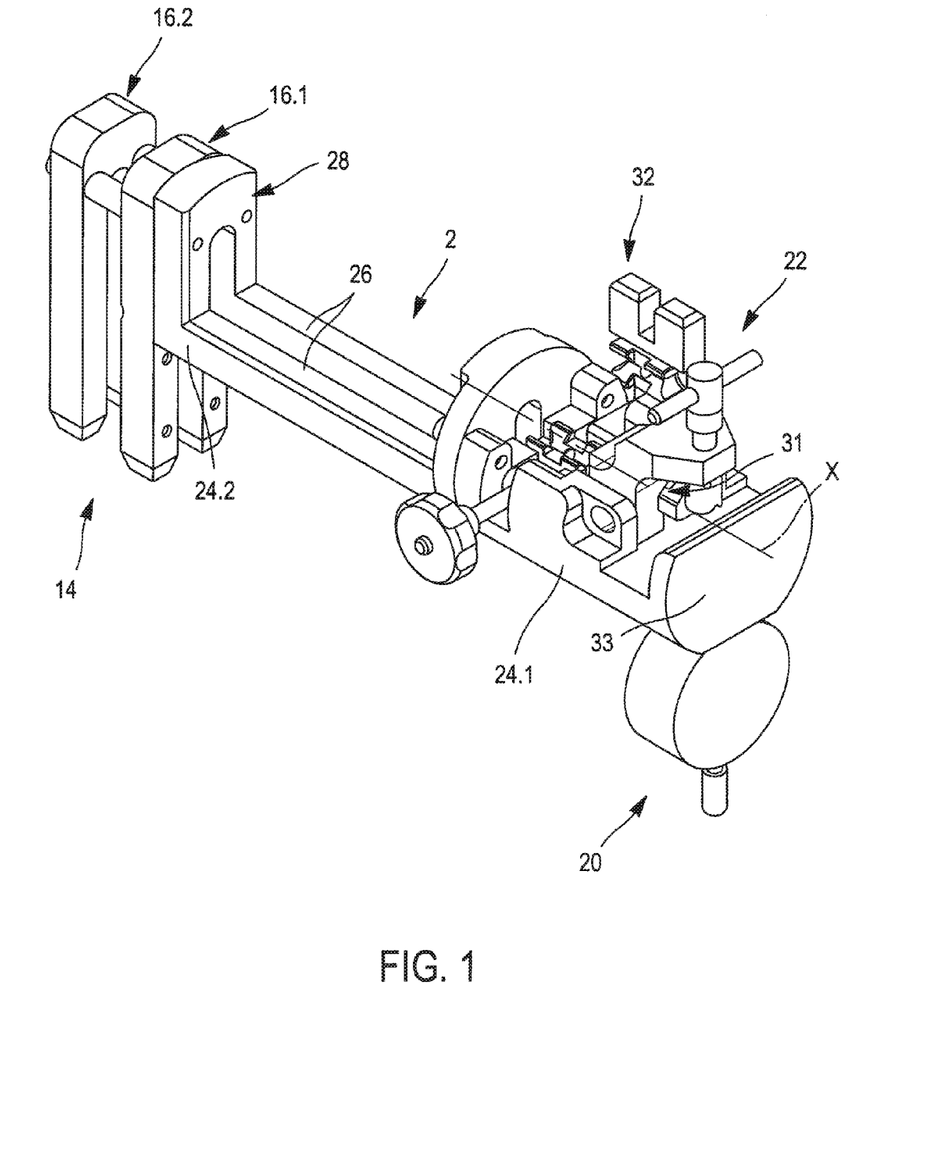
FIG. 1 is a three-quarters perspective view of an embodiment of a measuring and correction device according to the present invention, FIGS. 2A to 2I' are views of the device of FIG. 1 during the various steps for measuring and correcting a parallelism error of a nuclear fuel rod.
Figure 2A:
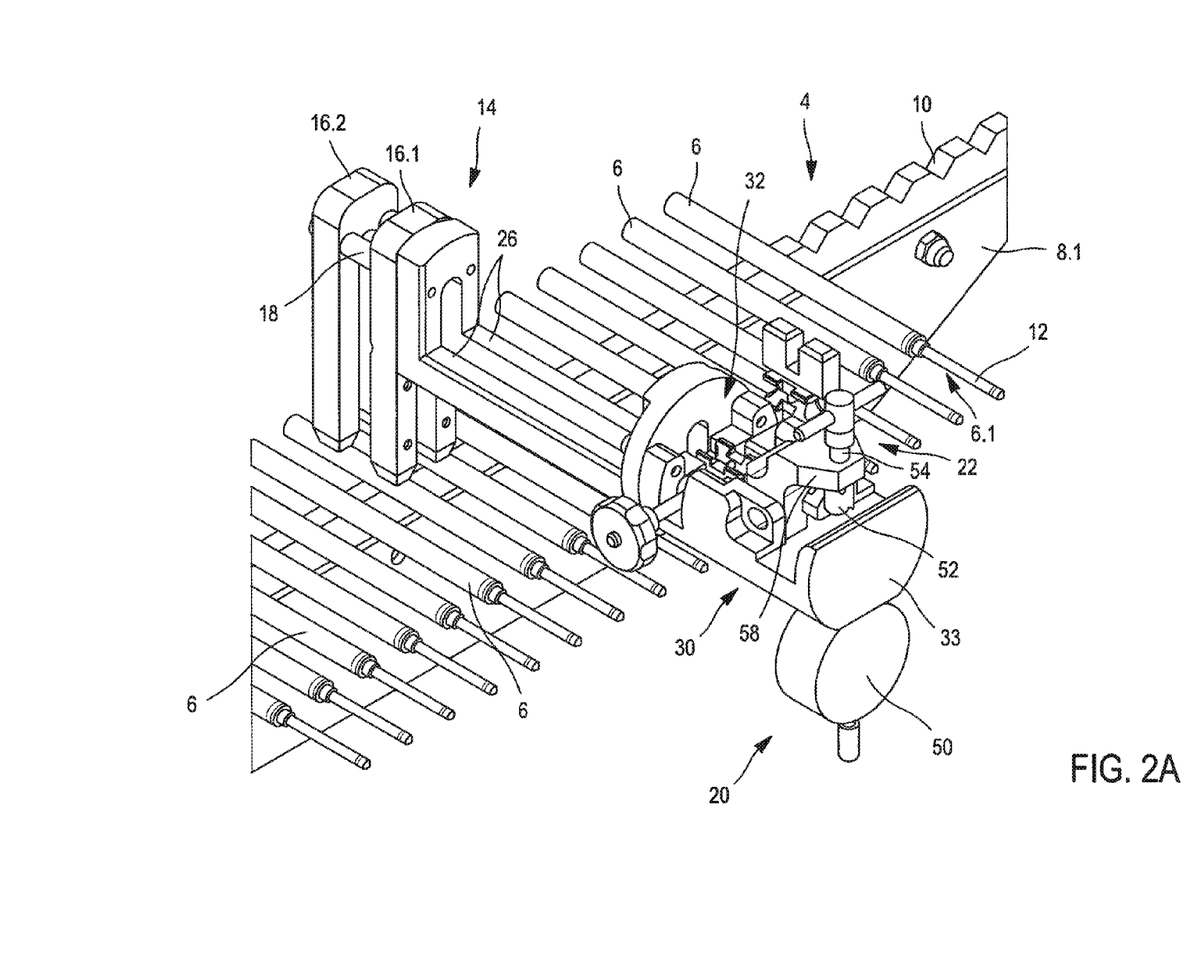

The device 2 is intended to be positioned on a rack 4, visible in FIG. 2A, on which the fuel rods 6 are stored.

The rack 4 comprises two parallel supports, spaced apart from each other and each supporting a longitudinal end of a fuel rod. Each support comprises notches 10 forming the housings for a longitudinal end of a fuel rod. FIG. 2 show the support 8.1 of the upper plug ends 6.1 of the fuel rods 6.

The fuel rods 6 are received in the notches 10 sufficiently upstream of the upper plug 12, so that the plug and part of the fuel clad are cantilevered on the support.

The device 2 comprises means 14 for positioning the device on the rack 4, more particularly on the support 8.1.

In the illustrated example, the positioning means 14 comprise two horseshoe-shaped parts 16.1, 16.2 rigidly held in a parallel manner by rods 18.

The width of the gap of the parts 16.1, 16.2 is substantially equal to the diameter of the fuel clad of a fuel rod to allow the parts 16.1, 16.2 to overlap a fuel rod.

Advantageously, the bottoms of the gaps have a radius of curvature substantially equal to that of the fuel clad of the fuel rod. The contact surface between the parts 16.1 and 16.2 and the fuel rod is therefore optimized, reducing the risk of deformation of the fuel rod.

Moreover, the distance separating the two parts 16.1, 16.2 is substantially equal to the thickness of the support 8.1, thus it is possible to arrange the parts on either side of the support, and the device is positioned fixedly relative to the fuel rod due to the small play between the faces of the support and the faces of the parts.

The device comprises means 20 for measuring a parallelism error and means 22 for correcting that parallelism error. These means 20, 22 are arranged at a first longitudinal end 24.1 of a mast 26, which is fixed by a second longitudinal end 24.2 to the positioning means 14.

In the illustrated example, the mast 26 is formed by two parallel beams 26 connected to each other at their second longitudinal ends on the side of the positioning means 14, by a horseshoe-shaped part 28.

The spacing of the two beams 26 is identical to the gap of the parts 16.1, 16.2. When the device is in place, the beams 26 extend on either side of the fuel rod.

The measuring 20 and correction 22 means are positioned on a platform 30, on which means 32 are also provided for holding a fuel rod. The holding means 32 are arranged between the positioning means 14 and the measuring and correction means.

A longitudinal location 31 with axis X of the fuel rod (cf. FIG. 2E) is delimited between the beams, and in the platform 30 between the holding means 32 and a bottom 33 forming a stop, the measuring means 20 and correction means 22 bordering that location 31.

We will now describe the holding means 32 in detail.

The holding means 32 are intended to sufficiently grip the fuel rod to serve as a reference for the measurement, while allowing the fuel rod to rotate around its axis.

The holding means comprise a V-shaped lower claw 34 intended to support the fuel rod, and a V-shaped upper claw 36 intended to come above the fuel rod to prevent it from moving in a plane orthogonal to the axis of the fuel rod.

The lower claw 34 forms the reference for the measurement.

Advantageously, the claws 34, 36 are made from a material allowing the fuel rod to slide, which makes it possible not to hinder the rotation. They are for example made from Ertalyte®.

In the illustrated example, the upper claw 36 is mounted on a platen 37, itself hingedly mounted on the platform 30 around an axis parallel to the axis of the fuel rod, which makes it possible to open the holding means and facilitate the mounting of the fuel rod. A system 38 is also provided to lock the upper claw 36 in the fuel rod holding position, i.e. opposite the lower claw 34. The locking system 38 comprises a rod 40 mounted on the platform 30, hinged in rotation thereon around an axis parallel to the axis X, on the side opposite that of the hinge axis of the upper claw 36.

The rod 40 comprises a threaded end 40.1 on which a button 44 is screwed. The platen 37 of the upper claw 36 comprises a notch 45 on the side opposite its hinge axis intended to receive the threaded rod 40, the button 44 being arranged outside so as to exert a gripping force on the platen to lock the upper claw 36 opposite the lower claw 34, in the position shown in FIG. 2C.

Any other system to allow the lower 34 and upper 36 claws to be spaced apart or brought closer together can be provided. For example, it can be provided to mount the upper claw 36 on two threaded rods, the upper claw 36 moving parallel to the lower claw 34. The locking is then caused by two nuts.

The platform comprises, downstream of the holding means, a ring 46 intended to react all of the deformation force necessary for the correction.

The means for measuring a parallelism error 20 are positioned at the free end of the platform 30 so as to be situated below the fuel rod, as shown in FIG. 2A.

Figure 2B:
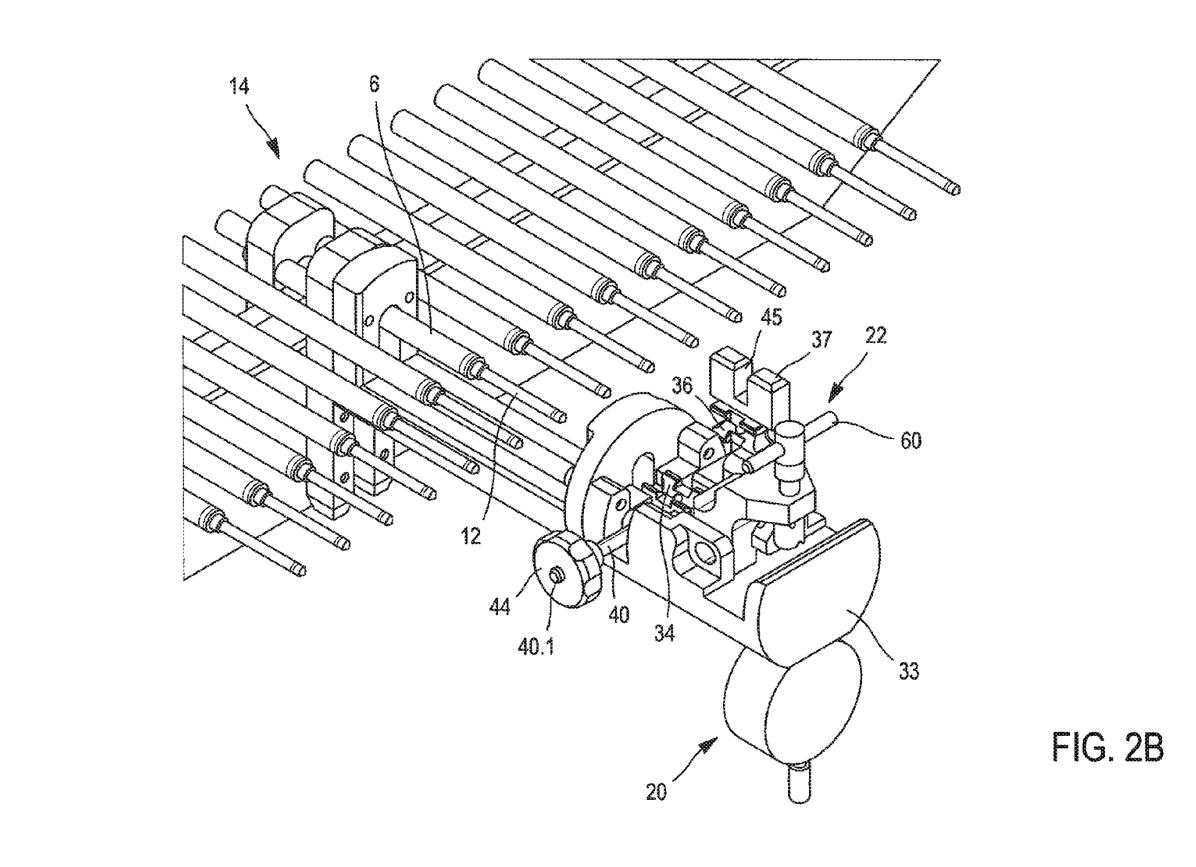
Figure 2C:
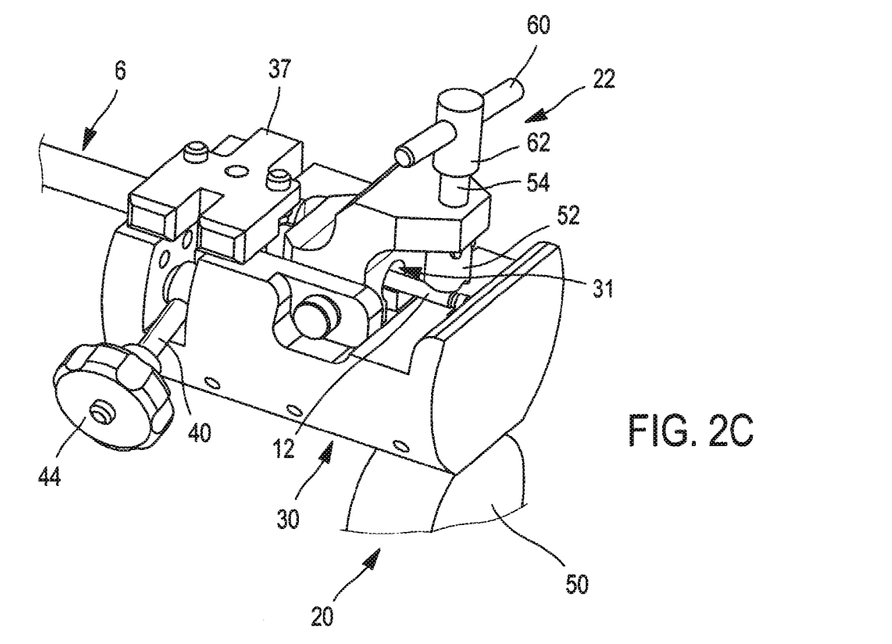

In the illustrated example and as shown in FIGS. 2B' and 2C', the measuring means 20 are of the mechanical thrust type, formed by a probe 47 able to slide in a bore 48 formed in the platform 30. In the illustrated example, the bore 48 is vertical. The probe 47 is intended to come into contact by its free end 47.1 with the upper plug end. The probe 47 is connected to a mechanical movement, to convert the longitudinal movement of the probe 47 into a parallelism error value.

This value is then displayed on a dial 50 to be visible to the operator. In the illustrated example, this is a needle dial.

The mechanical movement is made up of gears, connecting rods, and toothed sectors to enable this conversion.

It can be provided to use electronic means to convert this movement, for example using optical means, piezoelectric membranes, and to have a digital display.

Capacitive probes can also be used instead of a mechanical probe.

The measuring means form a comparator intended to compare the shape of the upper plug end of the fuel rod relative to a reference given by the lower claw 34, and to display the difference relative to said reference.

The probe 47 is recalled upwards by an elastic means ensuring a continuous contact of the probe on the fuel rod and allowing a continuous measurement.

The correction means 22 are intended to apply a force on the upper plug end so as to eliminate the error, or at least reduce it such that it is within acceptable tolerances.

The correction means 22 are arranged diametrically opposite the probe relative to the fuel rod such that, at the same time as the correction of the parallelism error, the probe of the measuring means can make it possible to continuously know the evolution of the error.

In the illustrated example, the movement axis of the push-piece 52 and that of the probe 47 are not in the same plane orthogonal to the axis of the fuel rod. But it is understood that this configuration is in no way limiting. The position of the push-piece depends on the force to be transmitted to the fuel rod. Moreover, in the illustrated example, it is arranged such that there is no interaction with the stop 33.

The correction means 22 comprise a push-piece 52 able to be moved vertically, intended to come into contact with the upper plug end to apply a deformation force thereon.

The push-piece 52 is for example mounted at the end of a threaded rod 54 mounted in a tapped hole 56 made at the end of an arm 58. The arm 58 is arranged such that the probe 52 is at the upper plug end of the fuel rod.

The rod 54 comprises a handle 60 at its end opposite the end supporting the push-piece 52, to facilitate the setting in rotation of the threaded rod 54 and the vertical movement of the push-piece 52. This screw-nut system facilitates the vertical movement of the push-piece 52. The push-piece 52 is mounted freely rotating on the threaded rod 54.

This embodiment is particularly simple and robust, and it is also light and not very bulky, which makes the device easily portable.

It is understood that any other means for moving the push-piece 52 is within the scope of the present invention, such as electric, mechanical, hydraulic . . . .

Advantageously, the push-piece 52 comprises a V-shaped groove intended to bear on the fuel rod. The force is thus better distributed on two generatrices of the fuel rod. Moreover, the presence of this groove makes it possible to improve the holding of the fuel rod during application of the deformation force, while avoiding deforming the surface of the fuel rod.

Advantageously, stop means 62 are provided to prevent excessive vertical movement of the push-piece 52 towards the probe, preventing an excessive deformation of the upper plug end.

These vertical stop means 62 are formed, in the illustrated example, by a ring fixed on the rod 54, on the side of the arm 58 opposite the push-piece 52. The ring 62 is fixed at a determined position preventing excessive deformation. The ring 62 abuts against the arm 58 to stop the movement of the push-piece 52 towards the probe, and therefore additional deformation of the fuel rod.

The bottom 33 of the platform 30 is downstream of the probe 47 and is intended to form an axial stop for the fuel rod. During operation, the free end of the fuel rod bears against said stop 33.

As an example, a device according to the present invention has a length of 308 mm, a height of 175 mm and a width of 71 mm, which makes it easy for a single operator to handle.

We will now describe the different steps in measuring and correcting a parallelism error of a nuclear fuel rod using a measuring and correction device according to the present invention.

The fuel rods are arranged on the rack 4.

The device 2 is brought vertically and placed straddling a fuel rod 6 and the support 8. The parts 16.1, 16.2 are arranged on either side of the support 8, and the beams are arranged on either side of the fuel rod (FIG. 2A). The device 2 then rests on the fuel rod by the bottom of the gaps of the parts 16.1, 16.2, as shown in FIG. 2B. In that position, the upper plug end is between the two beams (FIGS. 2B and 2B').

Then, the fuel rod is moved axially in order to arrange the upper plug end on the probe. To that end, the fuel rod slides on the lower claw 34, in the ring 46, until its free end bears against the bottom 33. During this introduction step, the probe 47 is kept in a low position to prevent interference between the fuel rod and the probe. When the fuel rod abuts against the bottom 33, the probe is released and bears against the upper plug end (FIGS. 2C and 2C').

Figure 2D:
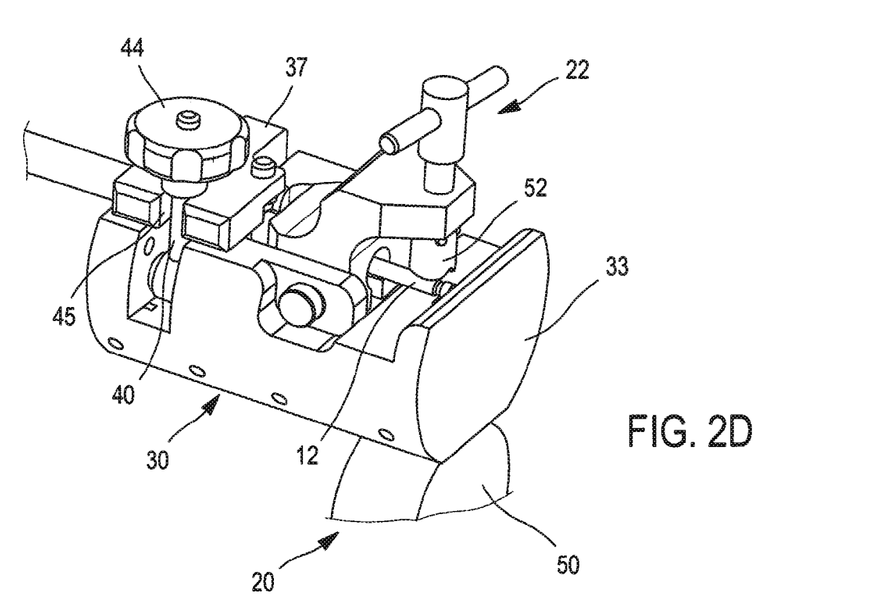

The upper claw 36 is then folded down on the fuel rod, the rod is introduced into the notch, and the button is turned to lock the lower 34 and upper 36 claws in this relative position. In FIG. 2D, the fuel rod is locked. During the locking, it is verified that the fuel rod and the probe are indeed bearing.

Figure 2E:
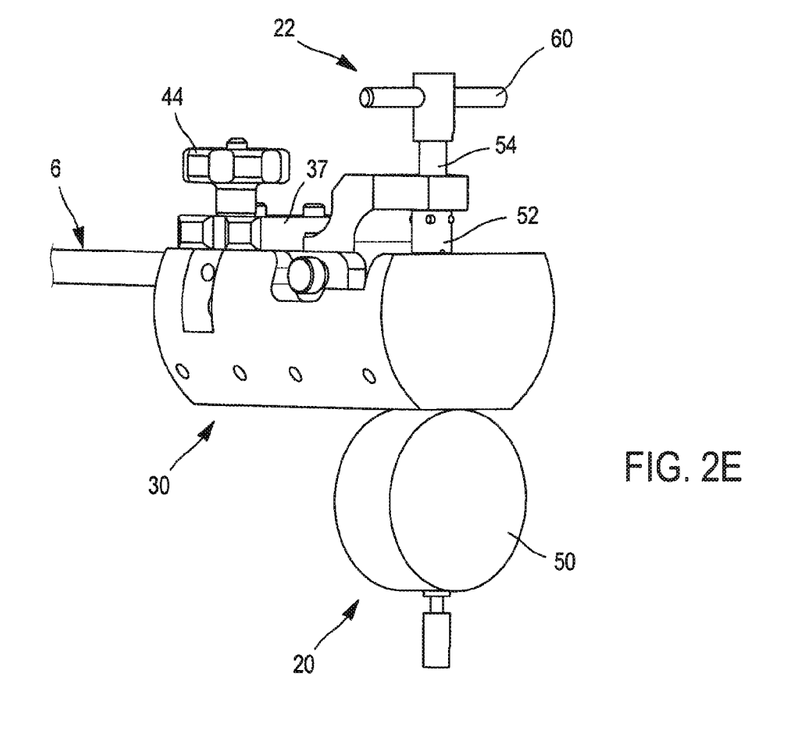
Figure 2F:
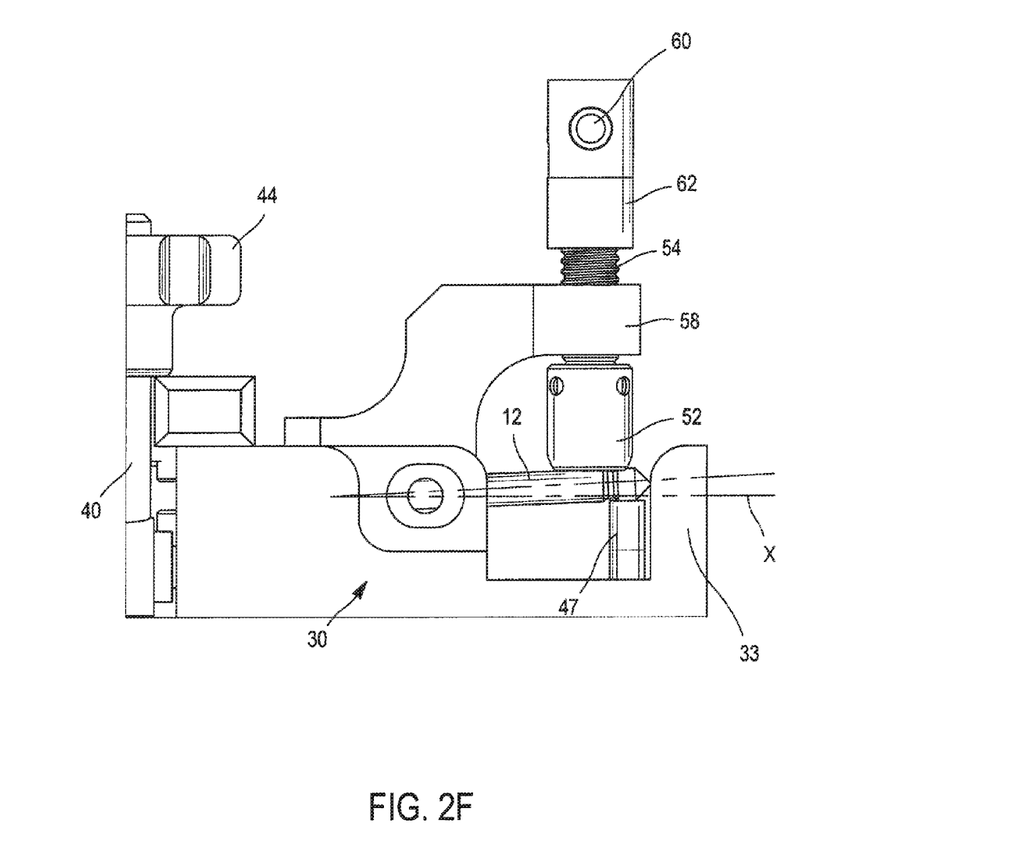
Figure 3A:
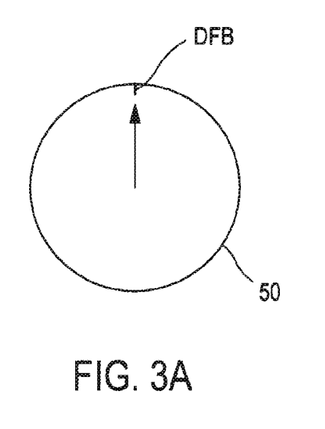
FIGS. 3A and 3B are diagrammatic illustrations of the dial of the measuring device during measurement of a parallelism error.
Figure 3B:
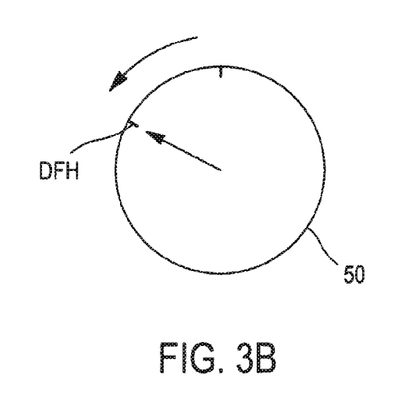

The operator first determines the error. To do that, the operator rotates the fuel rod around its axis, for example manually (FIG. 2E). The fuel rod is rotated until the operator detects a parallelism error. He notes the value indicated on the comparator (FIG. 3B) when the error is oriented upwards DFH as shown in FIG. 2F, and the value indicated on the comparator (FIG. 3A) when the error is oriented facing downwards DFB.

The operator then calculates the beat B, which is equal to the difference between DFH and DFB: D=DFH−DFB.

He then calculates the parallelism P, equal to half the beat: P=B/2=(DFH−DFB)/2.

From the value of P, the operator can determine what deformation must be applied to the fuel rod using the push-piece to correct the parallelism error of the fuel rod and make it acceptable.

The deformation is determined experimentally.

As an example, if P≤0.35 mm, the determined correction is 2.3 mm; if P≥0.35 mm, the determined correction is 2.4 mm.

It is for example necessary to apply a force corresponding to the force that must be applied on a cylindrical Zircaloy beam with a 5 mm diameter and 40 mm length, embedded at one end and free at the other, to deform the free end by 2.5 mm.

The operator then calculates the correction to be applied, i.e. the value to be read on the comparator when the error is oriented upwards and a force is applied with the push-piece.

This value $DFH_{toachieve}$ d is equal to the sum of the determined correction and the error DFH measured.

The operator then goes on to the step for correcting the fuel rod.

The operator positions the fuel rod such that the error is oriented upwards.

Figure 2G:
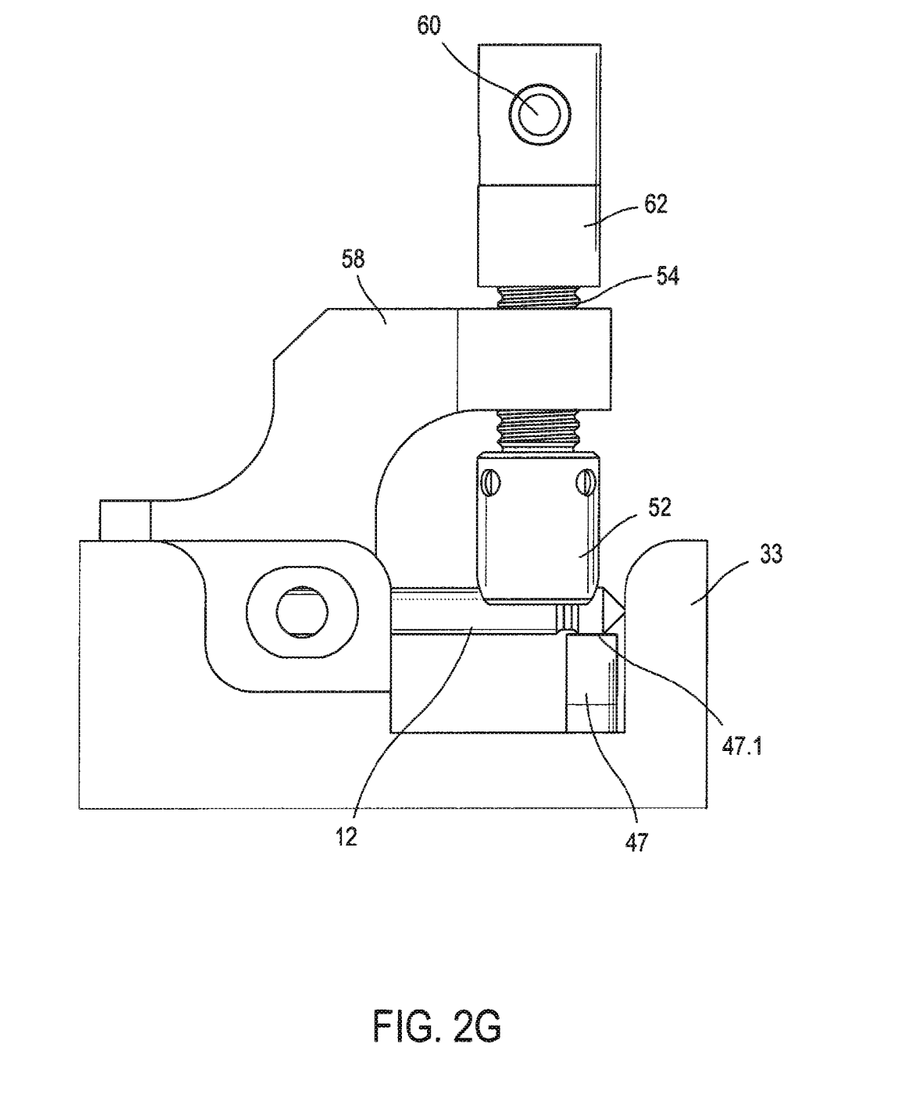

He then makes the push-piece 52 bear on the fuel rod, the fuel rod being received in the V-shaped groove, as shown in FIG. 2G, no force yet being applied on the upper plug end.

Figure 2H:
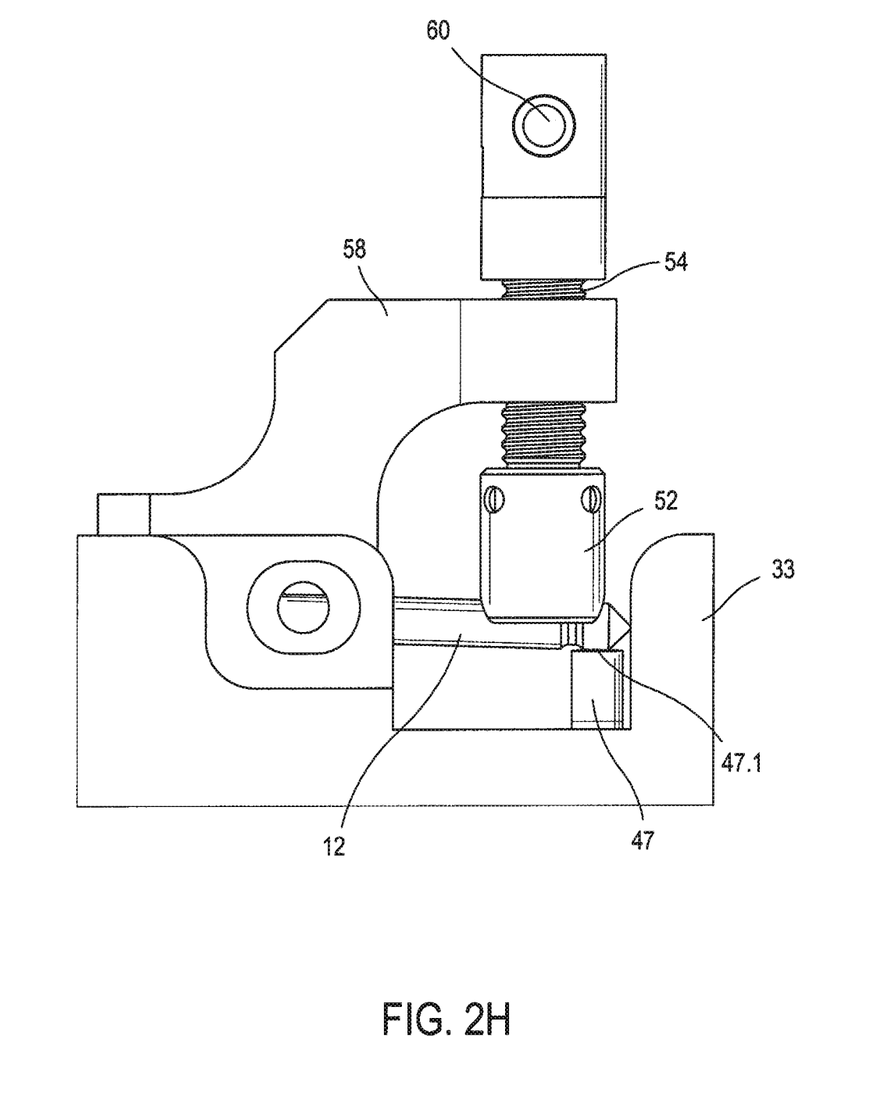
Figure 2I:
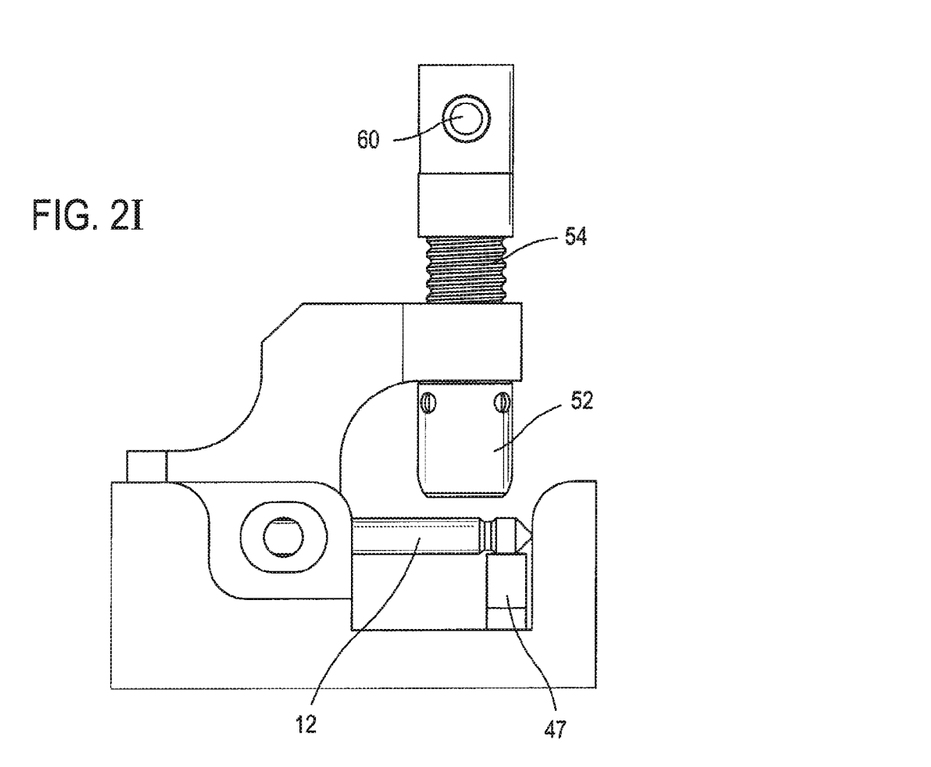

The handle is turned so that the push-piece applies a deformation force to the upper plug end towards the probe to modify the error, as shown in FIG. 2H, one can see that the probe 47 is pushed in.

The force applied is such that it causes a movement of the needle in the direction opposite the value DF of the error, then an additional movement by a given value to effectively cause a plastic deformation of the fuel rod. The operator moves the fuel rod until he reads the value $DFH_{toachieve}$ determined above on the comparator.

During correction of the error, the operator continuously views the deformation he applies to the fuel rod owing to the probe, which continues to measure the position of the upper plug end. This viewing makes it possible to avoid applying excessive force to the fuel rod. The correction method is therefore faster, since it is better controlled.

In a later step, the operator lifts the push-piece 52 (FIGS. 2I and 2I') and verifies the beat of the upper plug end.

To that end, the push-piece is put back in the high position. The operator again rotates the fuel rod, and determines the beat. He again measures the error when it is oriented upwards and the error when it is oriented downwards.

He deduces from this the beat B and the parallelism P.

If the value of this difference is below the given threshold, the fuel rod has a compliant parallelism.

For example, this threshold can be equal to 0.25, the beat must not, in that case, exceed 0.5.

If, during checking, the parallelism error is above the threshold, the operator restarts the preceding steps for correcting it by applying a deformation stress on the upper plug end and verifying the parallelism error.

Lastly, when the parallelism value is compliant, the fuel rod 6 is removed by making it slide away from the bottom 33 and the device 2 is removed.

It is understood that mechanical means can be provided for making the fuel rod rotate.

This device has the advantage of allowing a correction of the parallelism of the upper plug end of a fuel rod while making it possible to continuously quantify the deformation done, since the measuring means 20 remain active during the correction step.

Moreover, this device is compact, easy for a single operator to handle, and combines the measurement of the error with the correction of that error. It can be placed on each fuel rod with minimal handling of the fuel rods, only a longitudinal movement of several centimeters and rotational movements of the fuel rods around their axis being required.

Moreover, this device advantageously uses the rack as support. It therefore does not require any additional support elements.

In this description, the probe and the push-piece have vertical movements, but it is understood that a device whereof the probe and the push-piece have movements along the axes inclined relative to the vertical direction is not outside the scope of the present invention; in that case, it will be provided that the push-piece and the measuring system are opposite each other.

The invention claimed is:

1. A device for measuring and correcting a parallelism error of the upper plug end of a nuclear fuel rod placed on a rack, said device comprising:
a location with longitudinal axis for receiving said fuel rod,
device for measuring a parallelism error and corrector for correcting said error, said corrector being arranged opposite the measuring device relative to the longitudinal axis of the location of the fuel rod, in order to allow a measurement of the parallelism error during correction of said error,
positioner for positioning said device relative to the fuel rod, said positioner being intended to cooperate with the fuel rod and the rack, the rack comprising two parallel supports, spaced apart from each other and each supporting a longitudinal end of said fuel rod, said positioner comprising two horseshoe-shaped pieces whereof the inner ends are intended to rest on the fuel rod, the two pieces being spaced apart by a given distance, so as to allow the overlap of the support of the rack on which the upper plug end of the fuel rod rests when the device is put into place, said support having a thickness substantially equal to the distance separating the two horseshoe-shaped pieces, holder for holding the fuel rod while making it possible to rotate said fuel rod around its longitudinal axis, said holder being positioned between the positioned and the measurement device and corrector, said holder comprising a lower claw and an upper claw intended to grip the fuel rod, the lower claw forming a reference to measure the parallelism error.

2. The device for measuring and correcting a parallelism error according to claim 1, wherein the measuring device comprises a probe intended to come into contact with the periphery of the upper plug end of the fuel rod, said probe being able to move along an axis transverse to the axis of the location of the fuel rod.

3. The device for measuring and correcting a parallelism error according to claim 1, wherein the corrector comprises a push-piece intended to come into contact with the periphery of the upper plug end of the fuel rod, said push-piece being able to move along an axis transverse to the axis of the location of the fuel rod, the axis of movement of the push-piece and the axis of movement of the probe being contained in a plain containing the axis of movement of the fuel rod.

4. The device for measuring and correcting a parallelism error according to claim 1, wherein the claws are made from a friction-reducing material.

5. The device for measuring and correcting a parallelism error according to claim 1, wherein the upper claw is mounted hinged around an axis parallel to the axis of the location of the fuel rod, and means for locking the lower and upper jaws in the holding position being provided.

6. The device for measuring and correcting a parallelism error according to claim 5, wherein a stop is fixed on the rod to which the push-piece is fixed so as to limit the movement of the push-piece towards the probe.

7. The device for measuring and correcting a parallelism error according to claim 1, wherein the corrector comprises a push-piece intended to come into contact with the periphery of the upper plug end of the fuel rod, said push-piece being able to move along an axis transverse to the axis of the location of the fuel rod, the axis of movement of the push-piece and the axis of movement of the probe being contained in a plain containing the axis of movement of the fuel rod, and wherein the push-piece is mounted on one end of a threaded rod mounted in a tapped hole made at the end of an arm, said rod comprising a handle at the end opposite that on which the push-piece is fixed, making it possible to manually move the push-piece.

8. The device for measuring and correcting a parallelism error according to claim 1, comprising a ring between the holder and the corrector, with an axis parallel to the axis of the location of the fuel rod, said ring being intended to be passed through by the fuel rod and intended to react the deformation stresses applied to the fuel rod.

9. The device for measuring and correcting a parallelism error according to claim 1, comprising an axial stop for the fuel rod, said stop being arranged transversely relative to the axis of the location of the fuel rod, downstream of the measuring device in the direction of insertion of the fuel rod into the device.

10. The device for measuring and correcting a parallelism error according to claim 1, wherein the measuring device and the corrector are supported by a platform connected to the positioned by two parallel beams intended to border the fuel rod.

11. The device for measuring and correcting a parallelism error according to claim 1, wherein the upper claw is mounted hinged around an axis parallel to the axis of the location of the fuel rod, and means for locking the lower and upper jaws in the holding position being provided, and wherein the locking means comprises a threaded rod hingedly mounted around an axis parallel to the axis of the location of the fuel rod, on a side opposite that on which the upper claw is hinged, and a button screwed on the threaded rod, the upper claw comprising a notch to receive the threaded rod, the button being arranged opposite the lower claw relative to the upper claw to ensure the locking of the lower and upper claws, when the rod is in the notch.

12. A method for measuring and correcting a parallelism error of an upper plug end of a nuclear fuel rod placed on a rack, comprising:
  a) placing a measuring device on the fuel rod at the upper plug end, the measuring device including a locator with a longitudinal axis for receiving the fuel rod, a parallelism error measurer for measuring a parallelism error, a parallelism error corrector for correcting parallelism error, a positioner for positioning the device relative to the fuel rod, and a holder for holding the fuel rod while permitting rotation of the fuel rod around its longitudinal axis,
  b) moving the fuel rod along its axis to position it between the parallelism error measurer and parallelism error corrector,
  c) locking the holder,
  d) rotating the fuel rod and detecting the parallelism error,
  e) determining the correction to be made,
  f) orienting said error towards the parallelism error corrector,
  g) correcting said error by applying a deformation stress applied by the parallelism error corrector, and simultaneous checking with the information provided by the parallelism error measurer,
  h) verifying the parallelism error by checking that it is below a given threshold value,
  i) repeating steps d) to g) if the value of the parallelism error is above the given threshold value.

* * * * *